(12) United States Patent
Watanabe et al.

(10) Patent No.: US 8,275,518 B2
(45) Date of Patent: Sep. 25, 2012

(54) PARKING ASSIST APPARATUS

(75) Inventors: Kazuya Watanabe, Anjo (JP); Jun Kadowaki, Anjo (JP); Tsuyoshi Kuboyama, Kariya (JP); Yu Tanaka, Aichi-gun (JP); Yoichi Iwata, Nagoya (JP); Tetsunori Haraguchi, Tagata-gun (JP); Masahiko Yanagihara, Nissin (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 386 days.

(21) Appl. No.: 12/528,161

(22) PCT Filed: Feb. 18, 2008

(86) PCT No.: PCT/JP2008/052654
§ 371 (c)(1),
(2), (4) Date: Aug. 21, 2009

(87) PCT Pub. No.: WO2008/102726
PCT Pub. Date: Aug. 28, 2008

(65) Prior Publication Data
US 2010/0049401 A1   Feb. 25, 2010

(30) Foreign Application Priority Data
Feb. 22, 2007   (JP) ................. 2007-042513

(51) Int. Cl.
*B62D 6/00* (2006.01)
(52) U.S. Cl. ....... 701/41; 340/932.2; 340/435; 340/436; 340/437; 701/300; 701/301; 701/26

(58) Field of Classification Search ............... 340/932.2, 340/435, 436, 437; 701/41, 300, 301, 26
See application file for complete search history.

(56) References Cited

U.S. PATENT DOCUMENTS

| | | | |
|---|---|---|---|
| 6,223,847 B1 | 5/2001 | Shimizu et al. | |
| 6,704,653 B2 * | 3/2004 | Kuriya et al. | 701/301 |
| 6,825,828 B2 * | 11/2004 | Burke et al. | 345/101 |
| 7,085,634 B2 * | 8/2006 | Endo et al. | 701/36 |
| 7,825,828 B2 * | 11/2010 | Watanabe et al. | 340/932.2 |
| 2005/0049766 A1 | 3/2005 | Tanaka et al. | |

(Continued)

FOREIGN PATENT DOCUMENTS

JP   2005-162208 A   6/1923

(Continued)

OTHER PUBLICATIONS

International Preliminary Report on Patentability dated Sep. 11, 2009 (6 pages).

(Continued)

*Primary Examiner* — Thomas Black
*Assistant Examiner* — Sara Lewandroski
(74) *Attorney, Agent, or Firm* — Sughrue Mion, PLLC

(57) ABSTRACT

A target parking position setting section (23) is adapted to temporarily set a target parking position (p31, p32, p33) for the vehicle for each parking mode in a predetermined stop position. A parking mode determining section (25) is adapted to determine the parking mode and the target parking position corresponding to the parking mode based on an operation of a steering wheel performed by a driver after the target parking position (p31, p32, p33) is set. A guiding section (29) is adapted to guide the vehicle (1) to the determined target parking position (P3).

8 Claims, 10 Drawing Sheets

U.S. PATENT DOCUMENTS

| | | |
|---|---|---|
| 2006/0287825 A1 | 12/2006 | Shimizu et al. |
| 2006/0287826 A1 | 12/2006 | Shimizu et al. |
| 2007/0288145 A1* | 12/2007 | Maeda et al. .................... 701/41 |
| 2008/0154464 A1* | 6/2008 | Sasajima et al. ................. 701/42 |
| 2009/0118900 A1* | 5/2009 | Adachi et al. .................... 701/35 |

FOREIGN PATENT DOCUMENTS

| | | |
|---|---|---|
| JP | 11-001177 A | 1/1999 |
| JP | 11-321686 A | 11/1999 |
| JP | 2000-079860 A | 3/2000 |
| JP | 2001-006097 A | 1/2001 |
| JP | 2003-341543 A | 12/2003 |
| JP | 2004-009791 A | 1/2004 |
| JP | 2005-067565 A | 3/2005 |
| JP | 2005-324794 A | 11/2005 |

OTHER PUBLICATIONS

International Search Report of PCT/JP2008/052654 dated Apr. 22, 2008.

* cited by examiner (a)　　　　　　　　(b)

PARKING ASSIST APPARATUS

TECHNICAL FIELD

The present invention relates to a parking assist apparatus for assisting driving operations when parking a vehicle.

BACKGROUND ART

An example of the above-noted parking assist apparatus is an automatic steering apparatus for a vehicle shown in Patent Document 1 whose source is given below. With this automatic steering apparatus, the vehicle moves forward from a starting position and backward through a turning position to be guided to a target position. When the target position is set with the vehicle being at a stop, the automatic steering apparatus determines the stop position of the vehicle as the starting position. Since the starting position and the target position are determined in this manner, the automatic steering apparatus sets the turning position and calculates a forward movement route and a reverse movement route. A current position of the vehicle, the target parking position, the turning position, and the movement routes from the starting position to the parking position are displayed in a liquid crystal monitor. Setting of the target position and selection of a parking mode when the vehicle is at a stop are performed by a driver operating a mode selecting switch.

Patent Document 2 whose source is given below discloses a parking assist apparatus for assisting manual steering control by the driver. In this case, an instruction on the parking mode is also given to a controller by the operation of the switch performed by the driver.

Patent Document 1: Japanese Unexamined Patent Application Publication No. 11-1177 (see paragraphs 33 to 42; FIG. 5, for example)

Patent Document 2: Japanese Unexamined Patent Application Publication No. 2005-162208 (see paragraphs 8, 15, 21; FIG. 1, for example)

DISCLOSURE OF THE INVENTION

The automatic steering apparatus and the parking assisting apparatus disclosed in the above-noted patent documents contribute to reducing the driver's burden in parking the vehicle. On the other hand, the driver is also required to give the instruction on the parking mode manually other than the instructions to start the automatic steering and the parking assistance. Such instruction input is performed by a touch panel or any other control switch integrally formed with the display unit, which requires the driver to operate different input means than in a normal driving operation in order to set the parking mode. Thus, it is required to give the instruction on the parking mode in a more simple way in order to provide a parking assist apparatus with a greater convenience.

The present invention has been made having regarded the above-noted subject matter, and its object is to provide a parking assist apparatus with a greater convenience that is capable of giving the instruction on the parking mode by a simple process.

In order to achieve the above object, the parking assist apparatus for assisting parking of the vehicle in accordance with the present invention comprises:

a target parking position setting section for temporarily setting a target parking position for the vehicle for each parking mode in a predetermined stop position;

a parking mode determining section for determining the parking mode and the target parking position corresponding to the parking mode based on an operation of a steering wheel performed by a driver after the target parking position is set; and a guiding section for guiding the vehicle to the target parking position.

With this characteristic feature, the instruction on the parking mode is given using the steering wheel operated by the driver while driving the vehicle. The parking mode and the target parking position corresponding to the parking mode are determined based on the designated parking mode. According to the present invention, the driver is able to give the instruction on the parking mode in a simple way without taking his or her hands off from the steering wheel, which provides the parking assist apparatus with great convenience.

Further, the parking assist apparatus in accordance with the present invention is characterized in that the parking mode determining section determines that the parking mode is parallel parking when the steering wheel is not operated by a predetermined amount or more, while determines that the parking mode is garage parking when the steering wheel is operated by the predetermined amount or more in the vicinity of the predetermined stop position.

In performing the parallel parking, the vehicle is generally driven straight forward past the target parking position and then reversed with a turn. That is to say, the parking mode to be selected when the vehicle is driven straight forward further from the predetermined stop position is the parallel parking. Thus, the parking mode determining section determines that the parking mode is the parallel parking based on that the steering wheel is not operated by the predetermined amount or more. Based on this determination, the target parking position can be decided.

On the other hand, in performing the garage parking, the vehicle is generally driven obliquely forward with a turn from the target parking position and then reversed with a turn in a direction opposite to the previous turn. That is to say, the parking mode to be selected when the vehicle is driven obliquely forward from the predetermined stop position is the garage parking. Thus, the parking mode determining section determines that the parking mode is the garage parking based on that the steering wheel is operated by the predetermined amount or more. Based on this determination, the target parking position can be decided.

It should be noted that the operation of the steering wheel noted above corresponds to a steering direction when the vehicle is driven forward from the predetermined stop position. Thus, the operation of the steering wheel would not be in vein. In the case of the garage parking, in particular, a turn can be started at the moment the forward movement of the vehicle is started, which can decrease a moving distance of the vehicle from the predetermined stop position to the turning position where the reverse movement is started.

Further, the parking assist apparatus in accordance with the present invention is characterized in that the parking mode determining section determines that the parking mode is right side garage parking when the steering wheel is operated counterclockwise by a predetermined amount or more, while determines that the parking mode is left side garage parking when the steering wheel is operated clockwise by the predetermined amount or more in the vicinity of the predetermined stop position.

In performing the garage parking, the vehicle is generally driven obliquely forward with a turn in a direction opposite to the target parking position and then reversed with a turn in a direction toward the target parking position. That is to say, the parking mode to be selected when the vehicle is driven left obliquely forward from the predetermined stop position in the first place is the right side garage parking. On the other hand, the parking mode to be selected when the vehicle is driven right obliquely forward from the predetermined stop position in the first place is the left side garage parking. Thus, the parking mode determining section determines the direction of the garage parking satisfactorily. Based on this determination, the target parking position can be decided.

In addition, the operation of the steering wheel noted above corresponds to the steering direction when the vehicle is driven forward from the predetermined stop position. Thus, the steering operation for determining the parking mode is effectively used when the vehicle is driven forward, which decreases the moving distance to the turning position where the vehicle starts to be reversed. Moreover, the steering operation for determining the parking mode is the same as the operation in manually performing the garage parking, as a result of which the driver is able to input the instruction on the parking mode without an uncomfortable feeling.

Still further, the parking assist apparatus in accordance with the present invention is characterized in that the guiding section is adapted to guide the vehicle to a reverse movement starting position located forwardly of the predetermined stop position and then guide the vehicle to the target parking position located rearwardly of the reverse movement starting position, and that the parking mode determining section determines that the parking mode is right side parallel parking when the steering wheel is operated clockwise by the predetermined amount or more in the vicinity of the reverse movement starting position, while determines that the parking mode is left side parallel parking when the steering wheel is operated counterclockwise by the predetermined amount or more.

In performing the parallel parking, the vehicle is generally driven straight forward past the target parking position and then reversed with a turn. The turn is made in the right direction in the case of the right side parking while in the left direction in the case of the left side parking. Thus, the parking mode determining section determines the direction of the parallel parking when the steering wheel is operated by the predetermined amount or more after the vehicle reaches the reverse movement starting position. Based on this determination, the target parking position can be decided.

Moreover, the steering operation for determining the parking mode is the same as the operation in manually performing the parallel parking, as a result of which the driver is able to input the instruction on the parking mode without an uncomfortable feeling.

Still further, the parking assist apparatus in accordance with the present invention is characterized in that the parking mode determining section determines the parking mode based on the operation of the steering wheel when the vehicle is at a stop.

The amount of operation of the steering wheel can be determined more reliably if the parking mode is determined based on the amount of operation of the steering wheel when the vehicle is at a stop. In addition, since the parking mode is decided before the vehicle is moved, the subsequent guidance route can be quickly calculated.

Still further, the parking assist apparatus in accordance with the present invention is characterized in that the guiding section is adapted to guide the vehicle to the target parking position through a reverse movement starting position based on automatic steering control, and that the steering wheel acts as instruction input means for instructing the parking mode determining section on the parking mode after the parking assistance is started and before the automatic steering control is started, and acts as halt input means for instructing the guiding section of a halt of the automatic steering control after the automatic steering control is started and before the automatic steering control is completed.

If the parking assist apparatus controls the vehicle based on the automatic steering control, it is sometimes required that input means for giving the instruction on the parking mode or interrupting the automatic steering be separately provided. However, according to the present invention, the operation of the steering wheel can achieve both the instruction input means for giving the instruction on the parking mode and the halt input means for interrupting the automatic steering control. Those input means are distinguished from each other based on the time when the steering wheel is operated and thus would not be mixed up. As a result, the parking assist apparatus with great convenience having a simple arrangement is provided.

BEST MODE FOR CARRYING OUT THE INVENTION

First Embodiment

Figure 1:
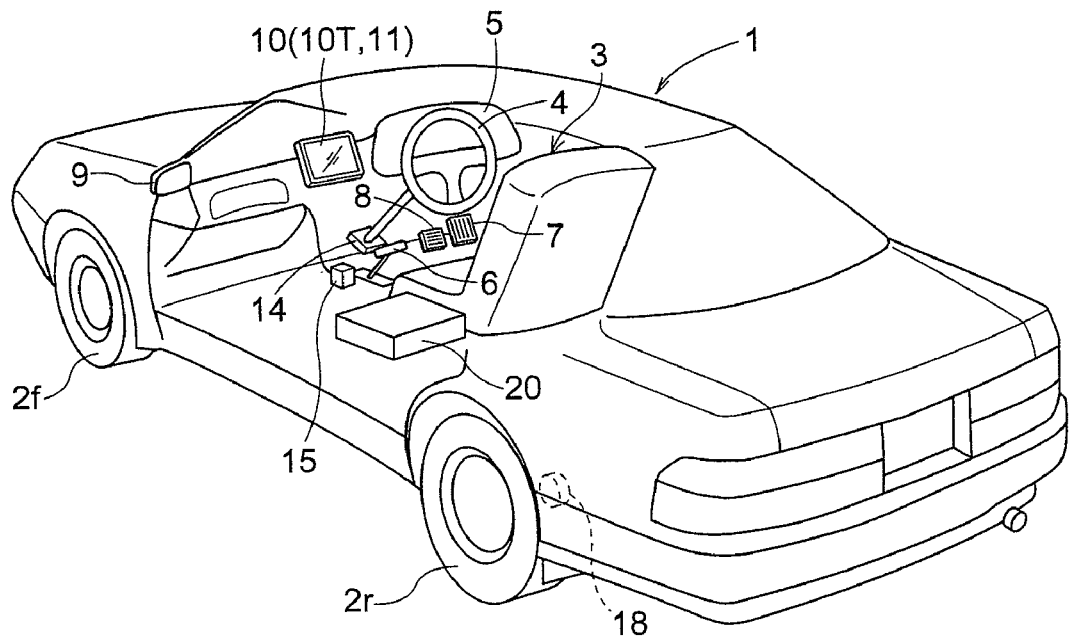
FIG. 1 is a partially cut-away perspective view of a vehicle exposing a driver's seat.
Figure 2:
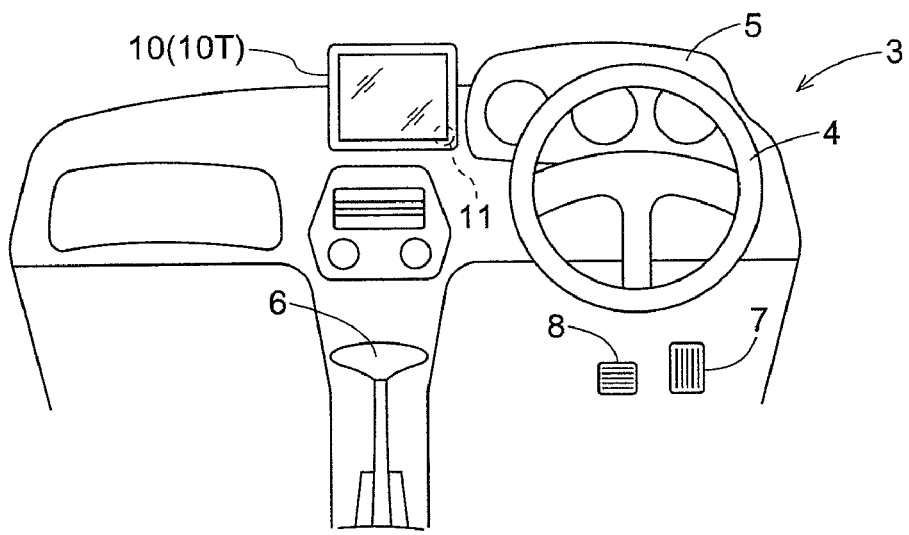
FIG. 2 is an explanatory view of a forward portion of the driver's seat.
Figure 3:
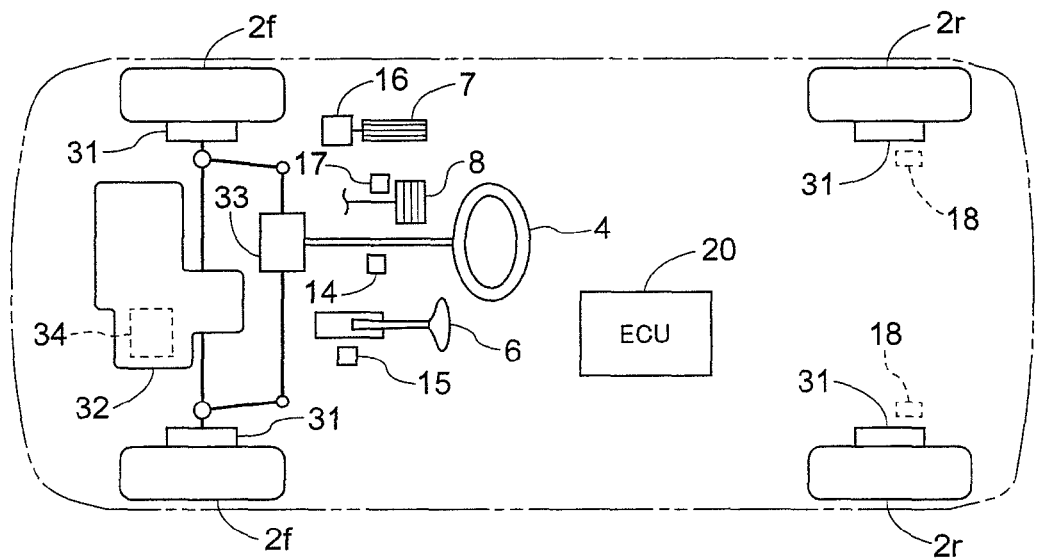
FIG. 3 is a top plan view of the vehicle schematically illustrating its components.

An embodiment of the present invention will be described hereinafter in reference to the accompanying drawings. Here, a parking assist apparatus for performing automatic steering control will be described as an example. FIGS. 1 to 3 show a basic construction of a vehicle 1.

A driver's seat 3 includes a steering wheel 4 interlocked with a power steering unit 33 for transmitting a rotational operational force to front wheels 2f for driving and steering the vehicle. At a forward portion of the vehicle are mounted an engine 32, and a transmission mechanism 34 including a torque converter and a CVT, for example, for changing speed of power from the engine 32 and transmitting it to the front wheels 2f. In the vicinity of the driver's seat 3 are arranged in parallel an accelerator pedal 7 acting as acceleration control means for controlling running speed, and a brake pedal 8 for operating brake devices 31 associated with the front wheels 2f and rear wheels 2r to exert a braking force on the front wheels 2f and the rear wheels 2r.

A monitor 10 (display section) including a touch panel 10T formed on a display surface thereof is mounted on an upper position of a console disposed adjacent to the driver's seat 3. The monitor 10 is provided with a speaker 11. The speaker 11 may be provided in a panel 5 or an inner side of a door. The monitor 10 is a backlight LCD type. It would be apparent that it also may be a plasma display type or a CRT type. The touch panel 10T used here is a pressure-sensitive type or an electrostatic type for outputting a position contacted by a finger or the like as location data. In the present embodiment, the monitor 10 is also used as a display device for a navigation system.

In the present embodiment, as described later, the touch panel 10T of the monitor 10 is used as instruction input means for starting parking assistance. Thus, the monitor 10 is dispensable if any other switch is provided as the instruction input means for starting the parking assistance.

A steering sensor 14 is provided in an operation system of the steering wheel 4 for measuring a steering direction and a steering amount. A shift position sensor 15 is provided in an operation system of a shift lever 6 for distinguishing a shift position. An accelerator sensor 16 is provided in an operation system of the accelerator pedal 7 for measuring the amount of operation of the accelerator pedal 7. A brake sensor 17 is provided in an operation system of the brake pedal 8 for detecting whether or not the brake pedal 8 is operated, for example.

A rotary sensor 18 acting as a moving distance sensor is provided for measuring the amount of rotation of at least one of the front wheels 2f and the rear wheels 2r. As a matter of course, it is possible to measure the amount of movement of the vehicle 1 based on the amount of rotation of a driving system in the transmission mechanism 34. The vehicle 1 further includes an ECU (electronic control unit) 20 for performing traveling control including the parking assistance.

Figure 4:
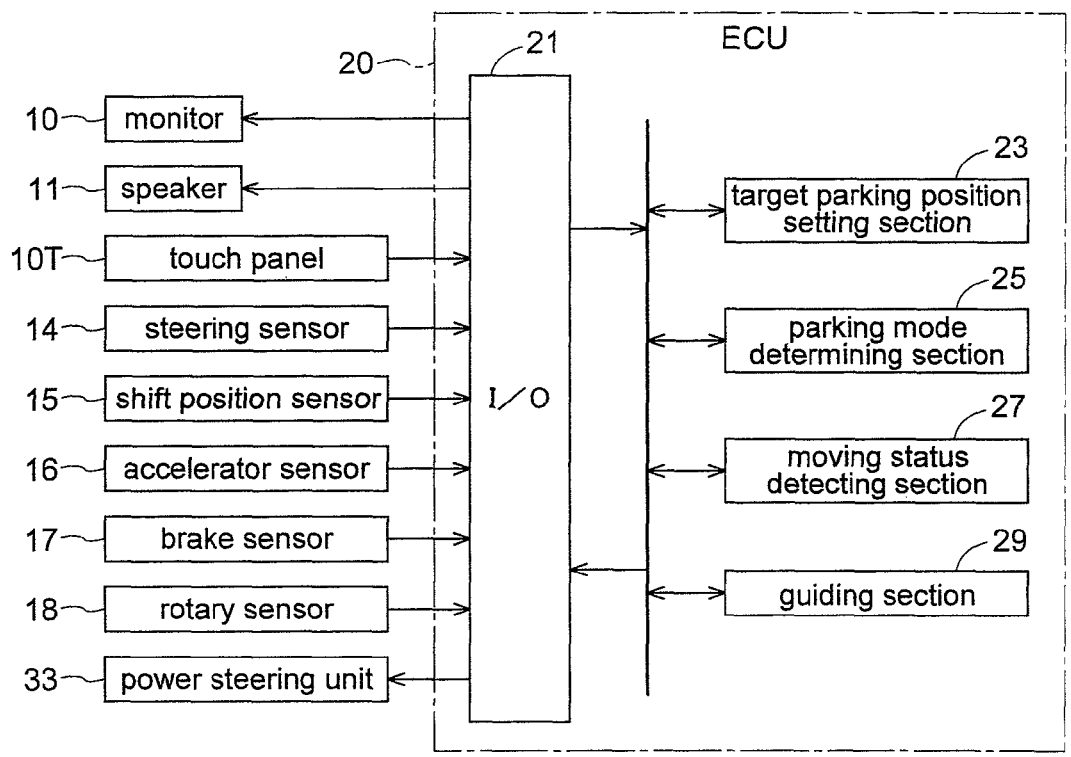
FIG. 4 is a block diagram schematically illustrating an arrangement of the components of a parking assist apparatus in accordance with the present invention.

FIG. 4 is a block diagram schematically illustrating an arrangement of the parking assist apparatus of the present invention. The parking assist apparatus of the present invention has the ECU function as a core component. The ECU includes an input/output interface 21 for dealing with input and output of information, and a microprocessor for processing the information received from the input/output interface 21. It should be noted that the input/output interface 21 may be included in part or entirely in the microprocessor. The ECU 20 consists of an electronic circuit having the microprocessor as a core element.

FIG. 4 shows an input system built for receiving information from the touch panel 10T, the steering sensor 14, the shift position sensor 15, the accelerator sensor 16, the brake sensor 17, the rotary sensor 18, and the like. Also, an output system is built for transmitting control signals to the monitor 10, the speaker 11, and the power steering unit 33. In the automatic steering control in the present embodiment, only the information is given for controlling the brake and the transmission mechanism, and the braking and the shift change operations are left to the driver. If the monitor 10 is not provided in the case where no navigation system is equipped, for example, the information is given only with voice through the speaker 11. Also, if the touch panel 10T is not provided in the absence of the monitor 10, the information is inputted to the input system from any other instruction input means such as the switch as noted above.

The ECU 20 includes functional sections connected to the input/output interface (I/O) 21. Such connection is established through data buses, address buses, control buses, and memories in the microprocessor, for example. Detailed illustration and description of such connection are omitted here to facilitate the explanation.

As shown in FIG. 4, the ECU 20 includes a target parking position setting section 23, a parking mode determining section 25, a moving status detecting section 27, and a guiding section 29. The present embodiment represents the case where those functional sections are activated in cooperation with the microprocessor and programs. On the other hand, it is also possible to form those sections with hardware using a logic circuit.

A parking assist process performed by the parking assist apparatus of the present invention will be described hereinafter in reference to a flowchart of FIG. 5 as well.

The driver who needs the parking assistance stops the vehicle 1 at a predetermined stop position relative to a location where he or she wants to park the vehicle 1 (intended parking location). Then, the driver gives the ECU 20 an instruction for starting the parking assistance at the predetermined stop position. To take an example, the driver gives the instruction for starting the parking assistance through the instruction input means such as the touch panel 10T. The ECU 20 confirms the starting instruction received through the input/output interface 21 (#1).

Figure 6:
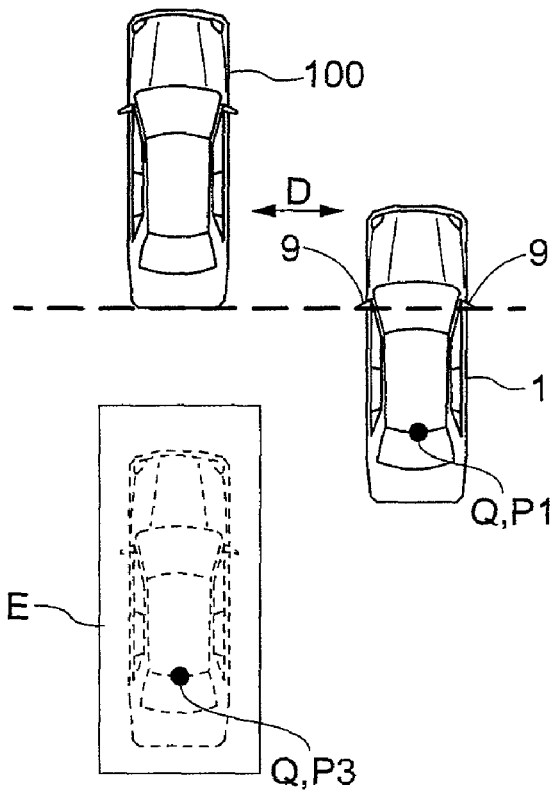
FIG. 6 is an explanatory view of the vehicle illustrating a predetermined stop position of the vehicle when the parking assist process is started for parallel parking.
Figure 7:
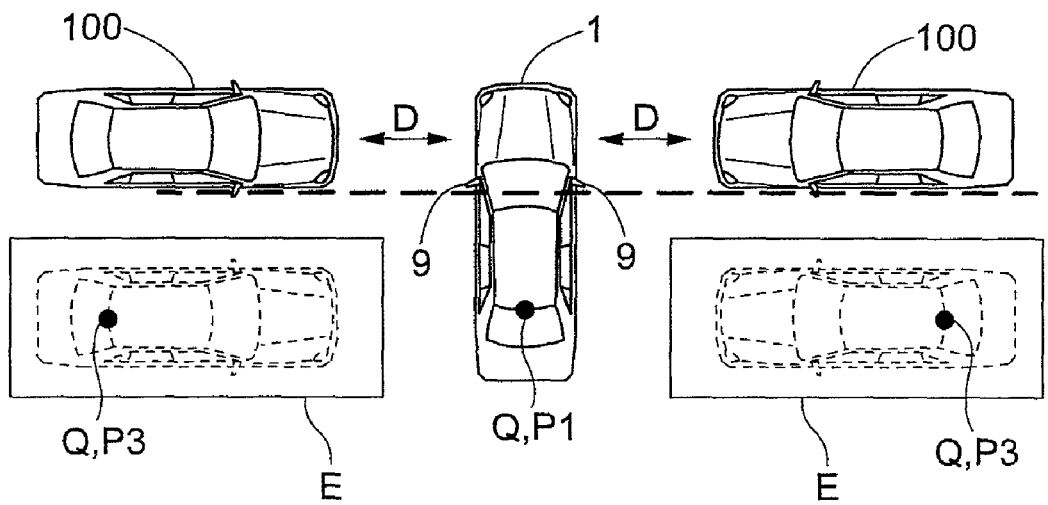
FIG. 7 is an explanatory view of the vehicle illustrating a predetermined stop position of the vehicle when the parking assist process is started for garage parking.

FIGS. 6 and 7 are explanatory views each showing the above-noted predetermined stop position. The driver stops the vehicle 1 at a location where an end of the intended parking location such as a parked vehicle 100 parked in front of or adjacent to the intended parking location can be designated. To be more specific, in the case of parallel parking, as shown in FIG. 6, the vehicle 1 is stopped at a position where side mirrors 9 of the vehicle 1 are aligned with the end of the intended parking location in a transverse direction of the vehicle 1. In the case of garage parking, as shown in FIG. 7, the vehicle 1 is stopped at a position where the side mirrors 9 of the vehicle 1 are aligned with the end of the intended parking location in the transverse direction of the vehicle 1. In those cases, the vehicle 1 is stopped at the position remote from the intended parking location by a distance D in the transverse direction of the vehicle 1. This establishes a relationship between the intended parking location and the vehicle 1 on a two-dimensional coordinate, providing the vehicle 1 is present in a horizontal plane.

As noted above, the instruction for starting the parking assistance is given at the predetermined stop position. Thus, the target parking position setting section 23 is capable of determining a parking target based on a reference position Q1 of the vehicle 1.

Figure 8:
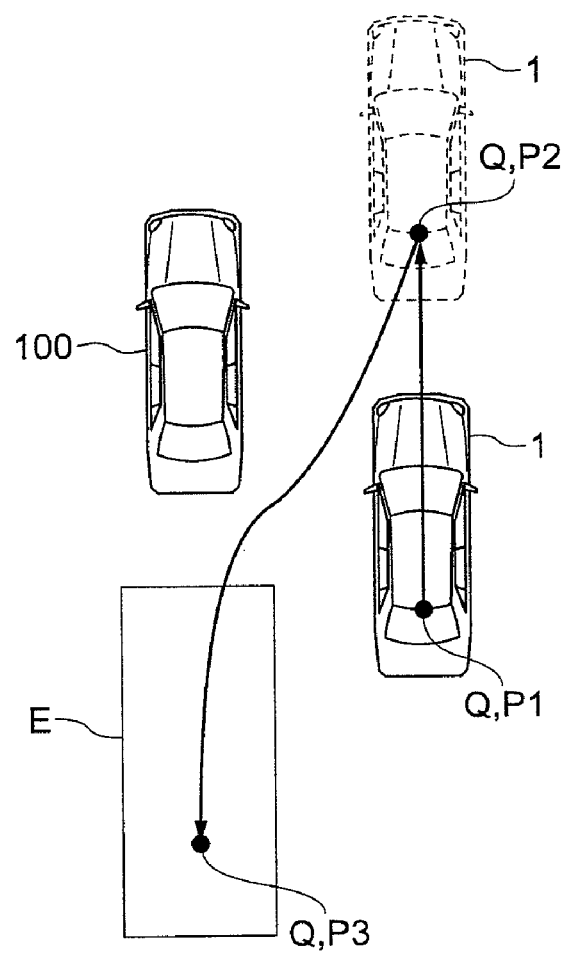
FIG. 8 is an explanatory view of the vehicle illustrating a guidance route in the parallel parking.

In the case of the parallel parking, as shown in FIG. 6, a target parking position P3 and a target parking area E are determined relative to an assistance starting position (predetermined stop position) P1. As shown in FIG. 8, the guiding section 29 determines a guidance route along which the vehicle moves straight forward from the assistance starting position P1 to a reverse movement starting position P2 and moves backward with a turn from the reverse movement starting position P2 to the target parking position P3.

Figure 9:
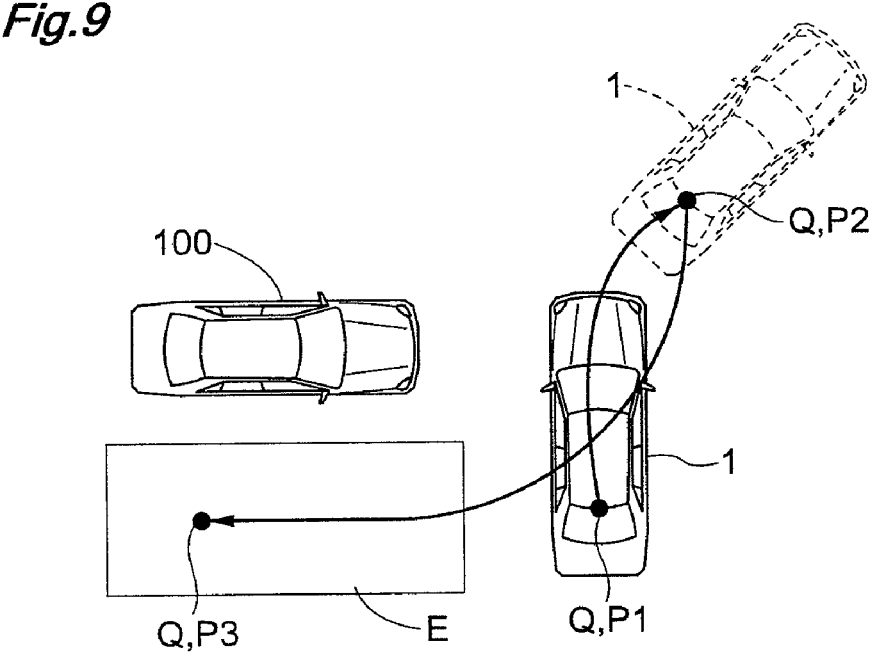
FIG. 9 is an explanatory view of the vehicle illustrating a guidance route in the garage parking.

In the case of the garage parking, as shown in FIG. 7, the target parking position setting section 23 determines the target parking positions P3 and the target parking areas E relative to the assistance starting position (predetermined position) P1. Then, as shown in FIG. 9, the guiding section 29 determines a guidance route along which the vehicle moves forward with a turn from the assistance starting position P1 to the reverse movement starting position P2, and then moves backward with a turn in a direction opposite to the previous turn from the reverse movement starting position P2 to the target parking position P3.

Figure 10:
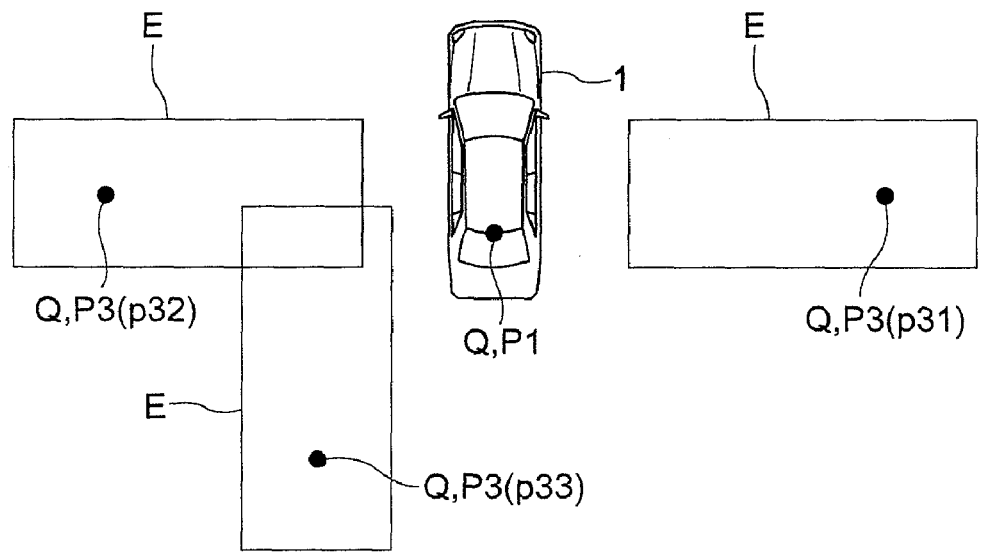
FIG. 10 is an explanatory view illustrating temporary set positions of target parking positions.

It should be noted that a parking mode such as the parallel parking or garage parking has not yet determined with the vehicle 1 being stopped at the predetermined stop position (assistance starting position P1). Thus, when the vehicle 1 is stopped at the predetermined stop position and the instruction for starting the parking assistance is given, all the possible target parking positions P3 and all the possible target parking areas E are temporarily set as shown in FIG. 10 (FIG. 5, #2). More particularly, the target parking position p31 in the case of the garage parking to the right side of the vehicle 1, the target parking position p32 in the case of the garage parking to the left side of the vehicle 1, and the target parking position p33 in the case of the parallel parking to the left side of the vehicle 1 are temporarily set as the target parking positions P3.

Referring back to FIGS. 8 and 9, in the case of the parallel parking, the vehicle 1 moves straight forward from the assistance starting position P1. On the other hand, in the case of the garage parking, the vehicle 1 moves forward with a turn depending on a parking direction. As shown in FIG. 9, in the case of the left side garage parking, the vehicle moves forward with a right forward turn. In the case of the right side garage parking, the vehicle moves forward with a left forward turn, though it is not shown in the drawings. In this manner, the movement of the vehicle from the assistance starting position P1 varies depending on the parking mode.

Then, the parking mode determining section 25 urges the driver to operate the steering wheel 4 through the input/output interface 21 and the speaker 11. More particularly, the driver is instructed with voice to operate the steering wheel 4 counterclockwise in the case of the right side garage parking and clockwise in the case of the left side garage parking. In this time, the amount of operation of the steering wheel 4 is simultaneously informed to the driver. For instance, the driver is informed of a quantitative value such as a maximum steering angle to the right or left side, or one turn or two turns of the steering wheel 4, for example. On the other hand, the driver is instructed with voice not to operate the steering wheel 4 in the case of the parallel parking.

The parking mode determining section 25 determines whether or not the amount of operation of the steering wheel 4 is not less than a predetermined amount of operation A (FIG. 5, #3) to decide whether the parking mode is the parallel parking or the garage parking. More particularly, it is determined that the parking mode is the garage parking when the amount of operation of the steering wheel 4 is not less than the predetermine amount of operation A. On the other hand, it is determined that the parking mode is the parallel parking when the amount of operation of the steering wheel 4 is less than the predetermined amount of operation A (#71).

Figure 5:
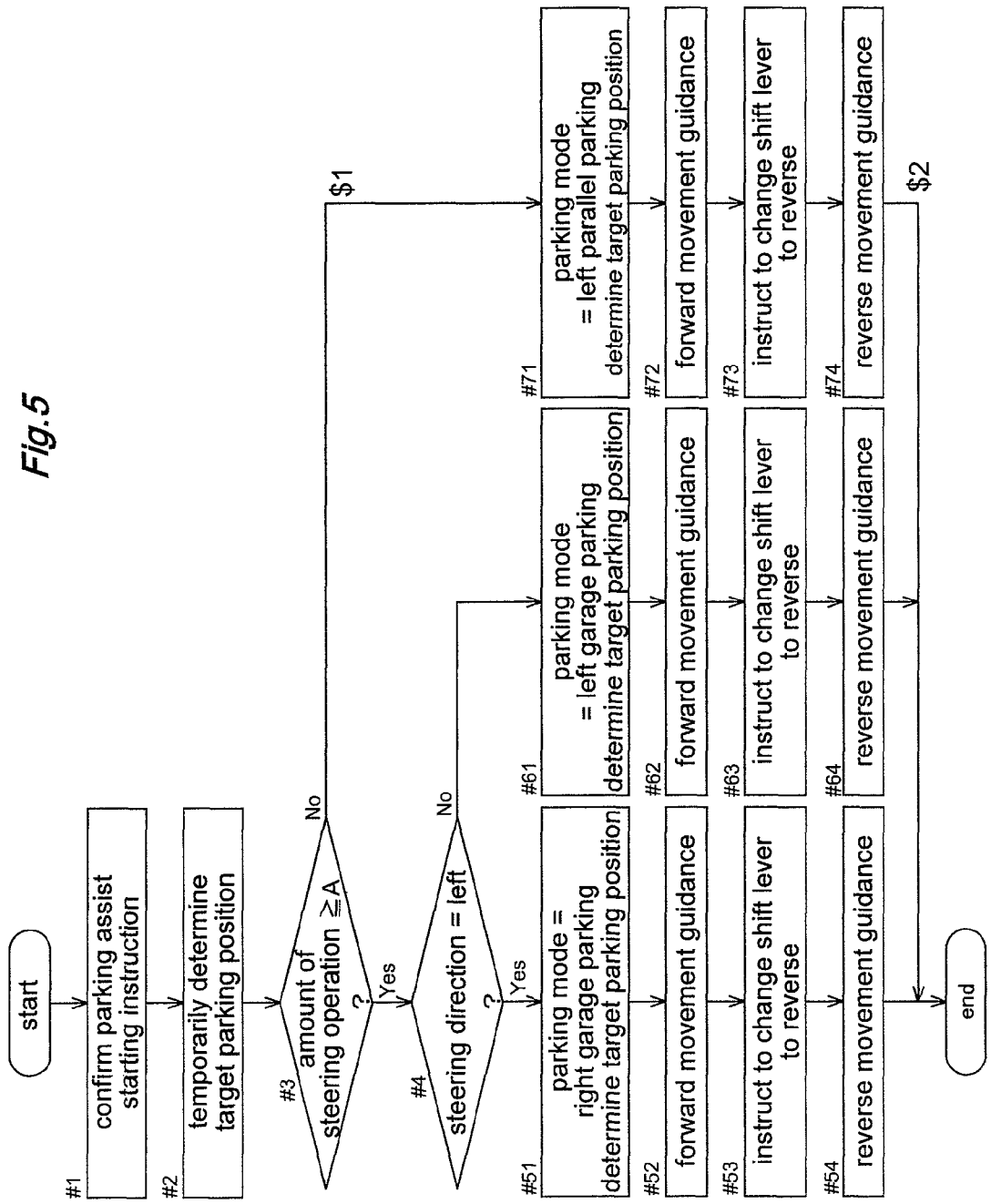
FIG. 5 is a flowchart illustrating a parking assist process performed by the parking assist apparatus in accordance with the present invention.

Further, the parking mode determining section 25 determines the steering direction, right or left, when the amount of operation of the steering wheel 4 is not less than the predetermined amount of operation A (FIG. 5, #4). Then, whether the parking mode is the right side garage parking or the left side garage parking is determined. More particularly, the parking mode is determined as the right side garage parking when the steering direction is left (#51) while determined as the left side garage parking when the steering direction is right (#61).

An initial parking mode may be preset as the parallel parking and switched to the garage parking when the steering wheel is operated by the predetermined amount A or more.

The time to determine the parking mode may be when a predetermined period of time lapses after the driver gives the instruction to start the parking assistance, or when the driver releases the brake pedal 7 to start the vehicle 1 by creeping, or both. For instance, when the driver starts the vehicle 1 immediately after giving the instruction to start the parking assistance, the parking mode may be determined as the parallel parking regardless of the lapse of the predetermined period of time.

The parking mode determining section 25 determines the parking mode based on the operation of the steering wheel 4 after the target parking position is temporarily set, or the instruction to start the parking assistance is given. The "operation of the steering wheel 4" includes the case where a steering angle is given prior to input of the instruction to start the parking assistance. It includes, for example, the case where the driver stops the vehicle 1 at the predetermined stop position (parking assistance starting position P1) and then operates the steering wheel 4 to give the instruction to start the parking assistance. The parking mode determining section 25 determines the parking mode based on the amount of operation of the steering wheel 4 (steering angle) after the instruction to start the parking assistance is given and after the predetermined period of time lapses or when the vehicle 1 is started.

It also should be noted that the parking mode may not necessarily be determined with the vehicle 1 being completely at a stop at the predetermined stop position. It may be determined with the vehicle moving slightly or at a different stop position after the vehicle moves slightly. In other words, the determination may be made in the vicinity of the predetermined stop position.

In this manner, according to the present embodiment, the parking mode may be advantageously determined by using the steering wheel 4 held by the driver while driving as the instruction input means without using any other special input means such as the touch panel 10T. In addition, as noted above, the amount of operation of the steering wheel 4 is informed to the driver with a quantitative value, which makes it possible to simultaneously set an initial steering angle when the vehicle moves from the assistance starting position P1.

In the present embodiment, the parking assistance is performed by the automatic steering control from the parking assistance starting position P1 to the target parking position P3. In the automatic steering control, the power steering unit 33 is driven by an actuator (motor, for example). A coefficient static friction becomes great when the vehicle 1 is at a stop, which makes it difficult for the power steering unit 33 to be driven by the actuator. Therefore, it is required that the steering angle be changed from a neutral state to a turning angle while the vehicle 1 is moving. However, this requires extra movement of the vehicle 1 until a target steering angle is obtained, and thus a distance of movement of the vehicle is increased when the parking assistance is performed. As a result, a larger space is required for the parking assist process, which may detract convenience, that is, possibly leads to unavailability of the parking assistance in a small parking lot, for example. The present embodiment can eliminate such a downside since the driver sets the initial steering angle when the vehicle moves from the parking assistance starting position P1.

When the parking mode determining section 25 determines the parking mode, the guiding section 29 starts guiding the vehicle to the target parking position P3. In the first place, a forward movement guidance to the reverse movement starting position P2 is performed (FIG. 5, #51, #61, #71). In the process of moving the vehicle 1 from the assistance starting position P1 to the reverse movement starting position P2, the calculation is performed based on the movement of a reference point Q.

Positional information (moving status) of the vehicle 1 in the process of movement is detected by the moving status detecting section 27. The moving status detecting section 27 detects the moving status of the vehicle 1 based on the input from the steering sensor 14, the rotary sensor 18, the accelerator sensor 16, the shift position sensor 15, the brake sensor 17 and the like shown in FIG. 4. Thus, the moving status detecting section 27 may include those sensors. Instead, other types of sensors such as a yaw rate sensor (not shown) may be used as the input to the moving status detecting section 27.

Figure 11:
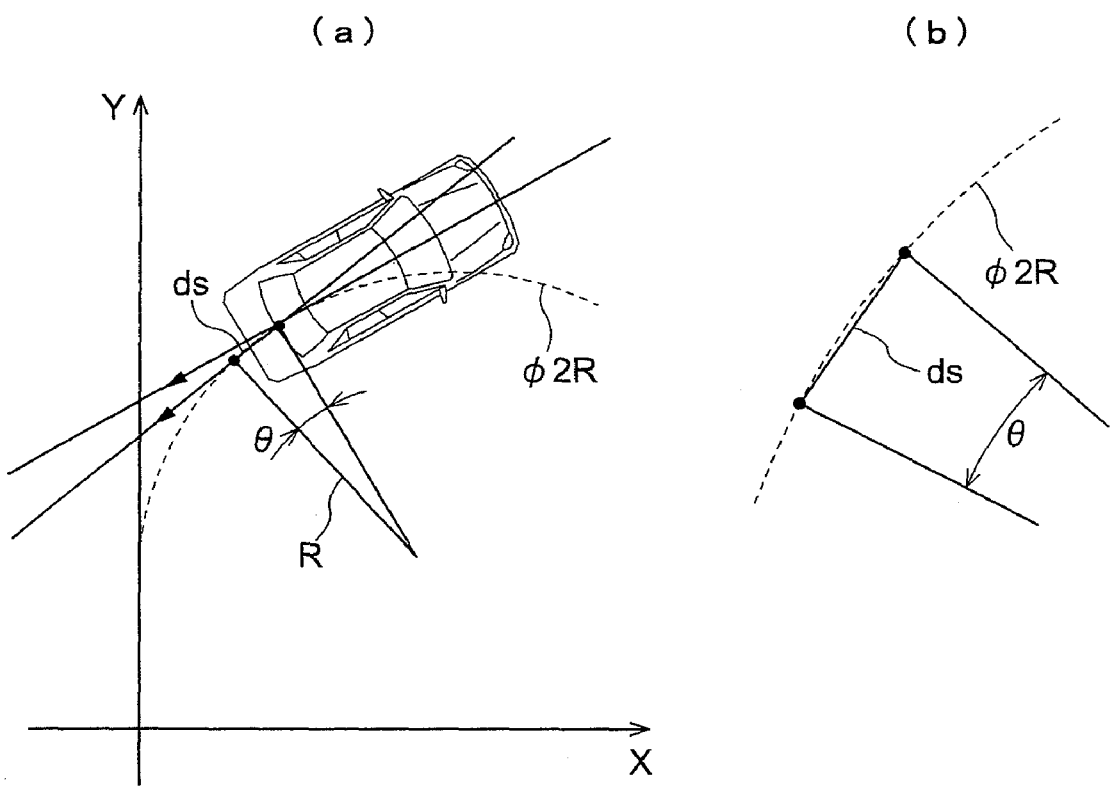
FIG. 11 is an explanatory view demonstrating a calculation process for detecting a position of the vehicle.

FIG. 11 shows an example in which a positional shift (moving status) of the vehicle 1 is detected based on the input from the steering sensor 14 or the rotary sensor 18, for example. FIG. 11 illustrates the reverse movement of the vehicle 1 turning with a turning radius R. The broken line in the drawings represents a locus of the vehicle 1 turning with the turning radius R, that is, an arc having a diameter φ2R. FIG. 11(b) is a partial enlarged view of FIG. 11(a). The moving status detecting section 27 detects the moving status of the vehicle by integrating the positional shift of the vehicle 1 during a brief period of time (slight moving distance) calculated based on the turning radius R of the vehicle 1.

In FIG. 11 and the following formulas (1) to (3), a sign "ds" represents the slight moving distance. The sight moving distance is calculated based on the input from the rotary sensor 18, for example. The turning radius of the vehicle 1 is calculated based on the input from the steering sensor 14. The integral range α in the formulas (1) to (3) represents an accumulated moving distance.

Numerical Formula 1

$$\theta = \int_0^\alpha \frac{1}{R} \cdot ds \quad (1)$$

$$X = \int_0^\alpha \sin\theta \cdot ds \quad (2)$$

$$Y = \int_0^\alpha \cos\theta \cdot ds \quad (3)$$

The guiding section 29 generates guidance sound through the speaker 11 during the forward movement guidance. The guidance sound is intermittent sounds such as beeps, for example. As the vehicle 1 approaches the reverse movement starting position P2, intervals between the intermittent sounds are gradually shortened. When the vehicle eventually reaches the reverse movement starting position P2, the guiding section 29 allows a continuous sound such as a beep to be outputted. The driver operates the brake pedal 8 in response to the information received through this guidance sound and stops the vehicle 1 in the vicinity of the reverse movement starting position P2. When the vehicle 1 comes to a stop, the output of the guidance sound is also stopped.

Next, the guiding section 29 generates an instruction to the driver through the speaker 11 to shift the shift lever 6 to a reverse position (FIG. 5, #53, #63, #73). As the driver shifts the shift lever 6 to the reverse position and releases the brake pedal 8, the guiding section 29 starts a reverse movement guidance to the target parking position P3 (#54, #64, #74). Similarly to the forward movement guidance, the calculation is performed based on the movement of the reference point Q.

In the present embodiment, the driver brakes the vehicle 1 in accordance with the guidance by the guiding section 29. Thus, the stop position of the vehicle 1 does not always exactly correspond to the reverse movement starting position P2, which raises no problem.

The steering angle of the vehicle 1 in the reverse movement starting position P2 is the neutral state regardless of the parking mode. The vehicle is guided straight to the revere movement starting position P2 in the case of the parallel parking, while is turned in a direction opposite to a previous turning direction at the reverse movement starting position P2 in the case of the garage parking, which means that the steering angle is controlled to be in the neutral state. It also should be noted that the guidance sound turns to the continuous sound when or after the vehicle 1 reaches the reverse movement starting position P2. Thus, the driver would never brake the vehicle 1 before reaching the reverse movement starting position P2. Even if the vehicle 1 is stopped before reaching the reverse movement starting position P2, the guidance sound would be still going off since the forward movement guidance is not completed. This makes the driver release the brake pedal 8 to move the vehicle forward further and then stop the vehicle 1 when it is moved to the reverse movement starting position P2.

As noted above, the vehicle 1 stops at the reverse movement starting position P2 or advances further past the reverse movement starting position P2 in a straight forward direction regardless of the parking mode. The straight forward movement is detected by the moving status detecting section 27. As a result, an excess distance beyond the reverse movement starting position can be canceled by straight reverse movement when the reverse movement guidance to the target parking position P3 is started.

In time of the reverse movement guidance, the guidance sound is generated through the speaker 11 in the similar manner to the forward movement guidance noted above. As in the forward movement guidance, the intermittent sounds such as beeps are produced at first, and then the intervals between the sounds are gradually shortened as the vehicle 1 approaches the target parking position P3. When the vehicle 1 eventually reaches the target parking position P3, the guiding section 29 allows the continuous sound such as a beep to be outputted. The driver operates the brake pedal 8 in response to the information received through this guidance sound and stops the vehicle 1 in the vicinity of the target parking position P3. With respect to the stop position of the vehicle, the situation is the same as the stop position described in relation to the reverse movement starting position P2. When the vehicle 1 comes to a stop, the output of the guidance sound is stopped.

As described above, the guiding section 29 is adapted to guide the vehicle 1 based on the automatic steering control from the predetermined stop position (assistance starting position p1) or its vicinity to the target parking position P3 through the reverse movement starting position P2. During that time, the driver simply operates the brake pedal 8 and the shift lever 6 in accordance with the guidance thereby to park the vehicle 1 satisfactorily.

On the other hand, it is also possible to input a halt instruction through the predetermined instruction input means such as the touch panel 10T if interruption of the parking assistance is desired when the circumstances change in the course of the guidance in which the position of the vehicle 1 is deviated when the parking assistance is started or any other vehicle enters the intended parking location, for example. The halt instruction may also be given by operating steering wheel 4 by the predetermined amount or more.

In the automatic steering control as in the present embodiment, even if the vehicle is temporarily stopped by braking when the other object (other vehicle, for example) enters the guidance route, the guidance is continued by releasing the brake pedal 8. This is because it is preferable that the brake control is frequently available by the driver for a safety check, restraining the troublesomeness. However, a degree of freedom for the driver in operating the steering wheel 4 is limited as long as the guidance route is predetermined. Once the vehicle deviates from the guidance route due to the operation by the driver, it would be difficult for the vehicle to even return to the guidance route. For this reason, it is preferable that the excess operation of the steering wheel 4 beyond the predetermined amount is recognized as the halt instruction.

In this case, the steering wheel 4 acts as steering means for steering the vehicle, and also acts as the instruction input means for instructing the parking mode determining section 25 on the parking mode after the parking assistance is started and before the automatic steering control is started and as the input means for instructing the guiding section 29 of a halt of the automatic steering control before the automatic steering control is completed.

As apparent from the first embodiment described above, the present invention provides the parking assist apparatus with great convenience that is capable of giving the instruction on the parking mode by a simple process.

Second Embodiment

Figure 13:
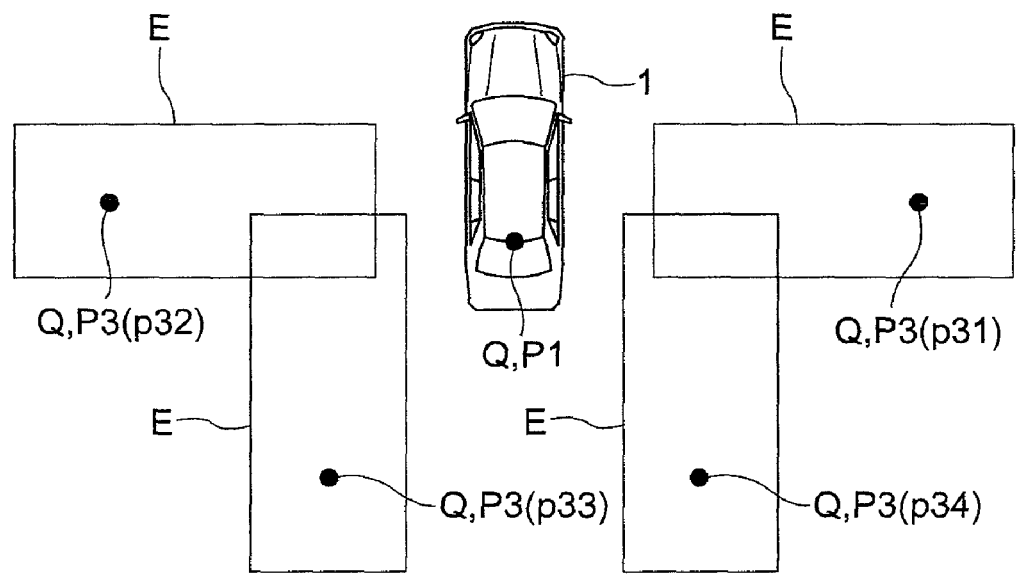
FIG. 13 is an explanatory view illustrating temporary set positions of target parking positions.
Figure 14:
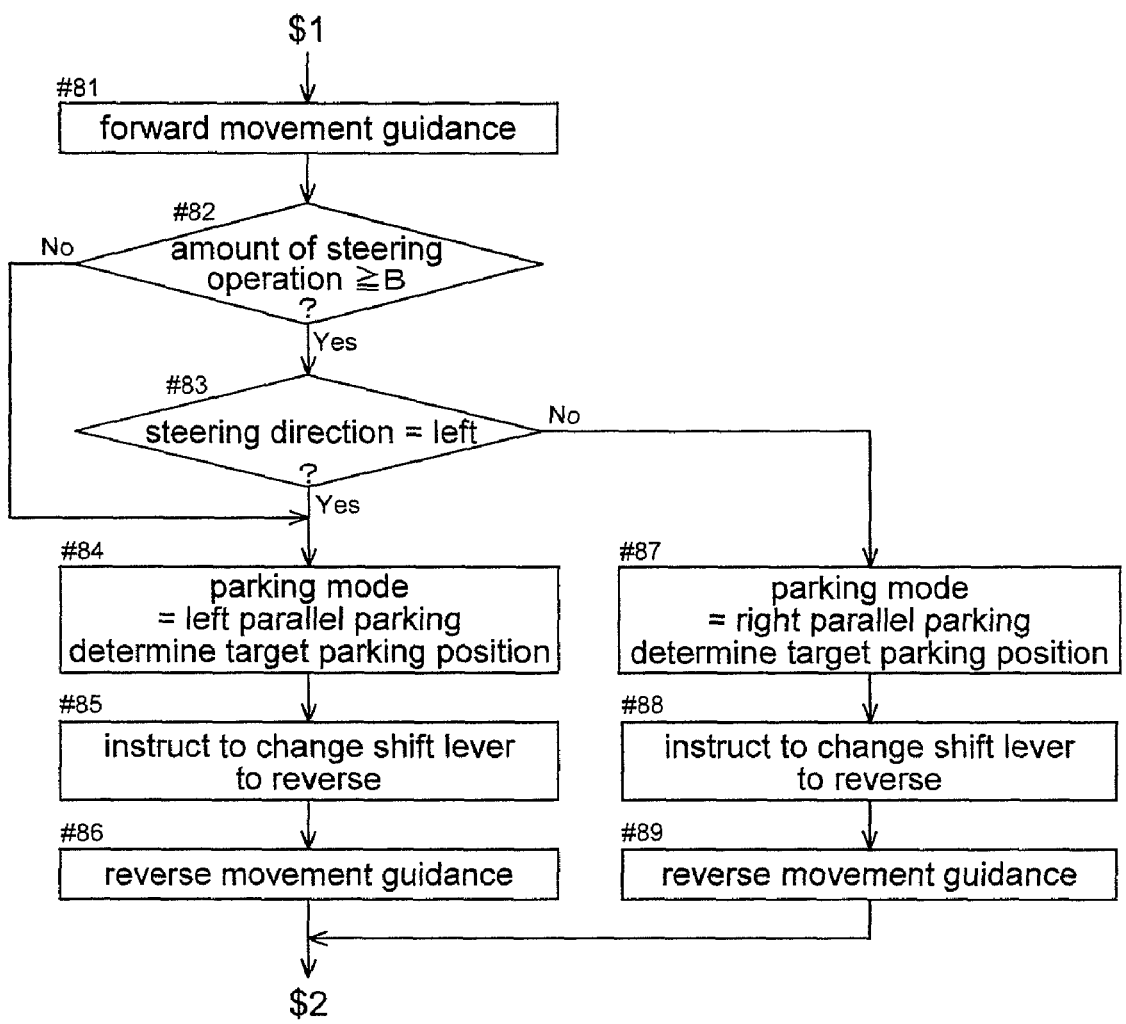
FIG. 14 is a flowchart illustrating a parking assist process in accordance with a second embodiment of the present invention.

A second embodiment of the parking assist apparatus in accordance with the present invention will be described hereinafter in reference further to FIGS. 12 to 14 as well. With respect to the like construction as in the first embodiment noted above, FIGS. 1 to 11 will be referred back to, and the detailed explanation thereof will be omitted.

In the first embodiment noted above, the parking mode referred to in the case of the parallel parking is only the left side parallel parking (see FIGS. 5, 6 and 10, for example). This is because the garage parking is generally required in a parking lot in most cases while the parallel parking is required on the road. The first embodiment only deals with the left side parallel parking, taking into the account countries or regions where vehicles are driven on the left side of the road. Instead, only the right side parallel parking may be employed as the first embodiment in countries and regions where vehicles are driven on the right side of the road.

The second embodiment described below takes an example relating to the parking assist apparatus capable of selecting the right side parking or left side parking in the case of the parallel parking.

Figure 12:
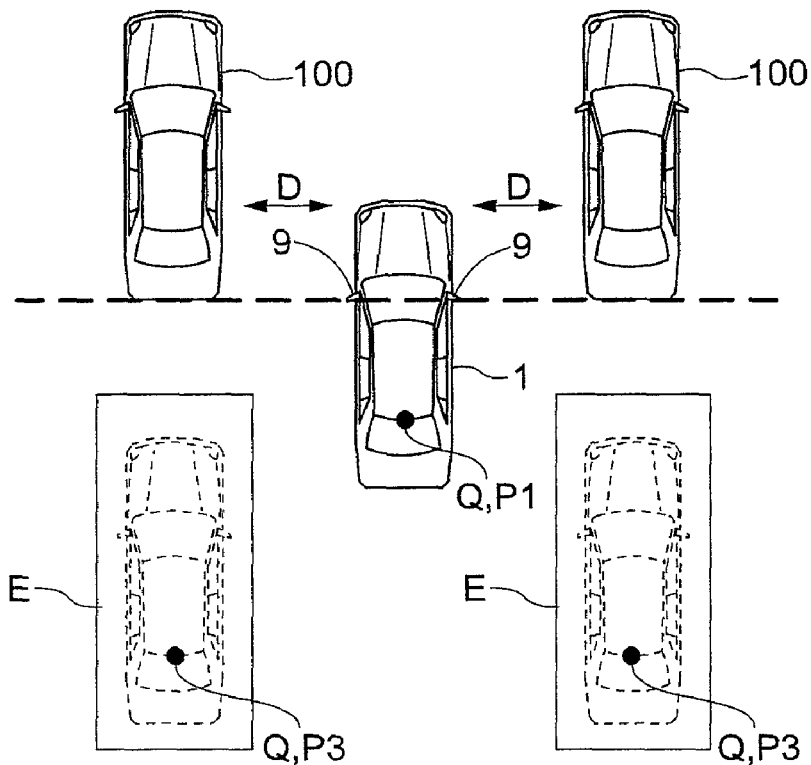
FIG. 12 is an explanatory view of the vehicle illustrating a predetermined stop position of the vehicle when the parking assist process is started for parallel parking.

FIG. 12 corresponds to FIG. 6 for the first embodiment which illustrates the predetermined stop position of the vehicle when the parking assistance is started for the parallel parking. Here, the predetermined stop positions are shown for both the right side and the left side of the vehicle in the case of the parallel parking.

The driver stops the vehicle 1 at the location where the end of the intended parking location such as the parked vehicle 100 parked in front of or adjacent to the intended parking location can be designated. To be more specific, in the case of the parallel parking, as shown in FIG. 12, the vehicle 1 is stopped at the position where the side mirrors 9 of the vehicle 1 are aligned with the end of the intended parking location in the transverse direction of the vehicle 1. In the case of the garage parking, as shown in FIG. 7 noted above, the vehicle 1 is stopped at the position where the side mirrors 9 of the vehicle 1 are aligned with the end of the intended parking location in the transverse direction of the vehicle 1. In those cases, the vehicle 1 is stopped at the position remote from the intended parking location by the distance D in the transverse direction of the vehicle 1. This establishes the relationship between the intended parking location and the vehicle 1 on the two-dimensional coordinate, providing the vehicle 1 is present in the horizontal plane.

As described above, the target parking position setting section 23 determines, in the predetermined stop position, the target parking position P3 and the target parking area E relative to the reference position Q. Then, as shown in FIGS. 8 and 9, the guiding section 29 determines the guidance route along which the vehicle moves forward from the assistance starting position P1 to the target parking position P3 through the reverse movement starting position P2.

Similarly to the first embodiment, the parking mode has not yet determined with the vehicle 1 being stopped at the predetermined stop position (assistance starting position P1). Thus, when the vehicle 1 is stopped at the predetermined stop position and the instruction for starting the parking assistance is given, all the possible target parking positions P3 and all the possible target parking areas E are temporarily determined as shown in FIG. 13. More particularly, the target parking position p31 in the case of the garage parking to the right side of the vehicle 1, the target parking position p32 in the case of the garage parking to the left side of the vehicle 1, the target parking position p33 in the case of the parallel parking to the left side of the vehicle, and the target parking position p34 in the case of the parallel parking to the right side of the vehicle 1 are temporarily set as the target parking position P3.

The process of temporarily determining the target parking position P3 (FIG. 5, #1 to #2) is the same as that of the first embodiment except that the number of the positions to be temporarily determined is four. The process performed by the parking mode determining section 25 is also the same for determining whether or not the steering wheel 4 is operated by the predetermined operating amount A or more (FIG. 5, #3) to decide whether the parking mode is the parallel parking or the garage parking. However, if the parking mode is determined as the parallel parking here, the process does not proceed to the step #71 shown in FIG. 5. In the second embodiment, the process shifts to the flowchart shown in FIG. 14 at a route $1 to implement the control relating to the parallel parking, and then returns to the flowchart shown in FIG. 5 at a route $2. When the parking mode is determined as the garage parking, the same control process as in the first embodiment is performed through the step #4 shown in FIG. 5, the detailed description of which is omitted accordingly.

The control process after the parking mode is determined as the parallel parking will be described hereinafter based on FIG. 14. When the parking mode is determined as the parallel parking at the step #3, the forward movement guidance is performed in the similar manner to the first embodiment (#81) to stop the vehicle 1 in the vicinity of the reverse movement starting position P2. The process for stopping the vehicle and the details of the stop position are the same as in the first embodiment. Here, the parking mode determining section 25 urges the driver through the speaker 11 to operate the steering wheel 4. More particularly, the driver is instructed by the voice information to steer the steering wheel 4 in the right direction in the case of the right side parallel parking while to steer the steering wheel 4 in the left direction in the case of the left side garage parking. In this time, the amount of operation of the steering wheel 4 is simultaneously informed to the driver with a quantitative value. Since a curvature of a turn of the vehicle in the parallel parking is small, the amount of operation of the steering wheel in the case of the parallel parking is less than the amount of operation in the case of the garage parking before the forward movement guidance is started noted above.

The parking mode determining section 25 determines whether the amount of operation of the steering wheel 4 is not less than a predetermined amount of operation B (#82), and then decides whether or not the parking mode is the left side parallel parking. More particularly, when the amount of operation of the steering wheel 4 is less than the predetermined amount of operation B, the parking mode is determined as the left side parallel parking which is the initial value like the first embodiment (#84). On the other hand, when the amount of operation of the steering wheel 4 is not less than the predetermined amount of operation B, the parking mode is determined as the left side parallel parking or the right side parallel parking depending on the steering direction (#83).

The parking mode determining section 25 determines the parking mode as the left side parallel parking if the steering wheel 4 is steered in the leftward direction (#84), while as the right side parallel parking if the steering wheel 4 is steered in the rightward direction (#87).

The guiding section 29 gives the instruction to the driver through the speaker 11 to shift the shift lever 6 to the reverse position (#85, #88). When the driver shifts the shift lever 6 to the reverse position and releases the brake pedal 8, the guiding section 29 starts the reverse movement guidance to the target parking position P3 (#86, #89). In time of the reverse movement guidance, the calculation is performed based on the movement of the reference point Q as in the first embodiment.

The time to determine the parking mode is basically when the predetermined period of time lapses after the vehicle 1 reaches the reverse movement starting position P2 to come to a stop. However, the parking mode may be determined at the time when the driver shifts the shift lever 6 to the reverse position without waiting for the lapse of the predetermined period of time.

It also should be noted that the parking mode may not necessarily be determined with the vehicle 1 being completely at a stop at the predetermined stop position. It may be determined with slight movement of the vehicle or at a different stop position after the vehicle moves slightly. In other words, the determination may be made in the vicinity of the predetermined stop position.

It has been described above that the parking mode is determined at the step #82 and decided at the step #84 as the left side parallel parking representing the initial value when the amount of operation of the steering wheel 4 is less than the predetermined amount of operation B. Thus, if the shift lever 6 is shifted at the reverse movement starting position P2 without the steering wheel 4 being operated and the brake pedal 8 is released to start the vehicle 1, the parking mode may be determined as the left side parallel parking. In this case, the parallel parking control process that is substantially the same as in the first embodiment is performed.

Third Embodiment

Figure 15:
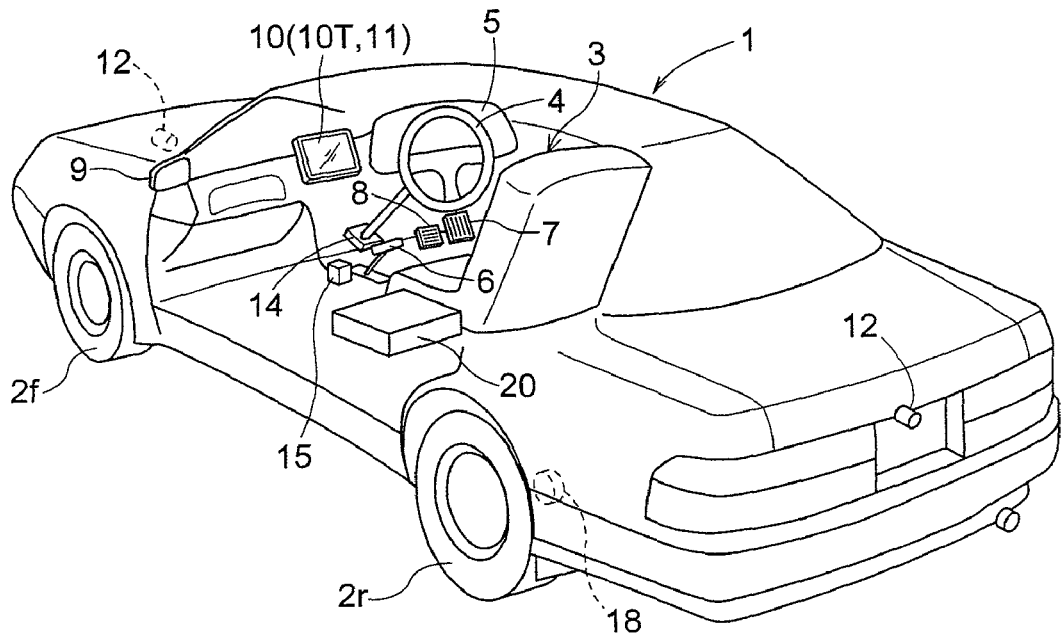
FIG. 15 is a perspective view of a vehicle in accordance with a third embodiment of the present invention.
Figure 16:
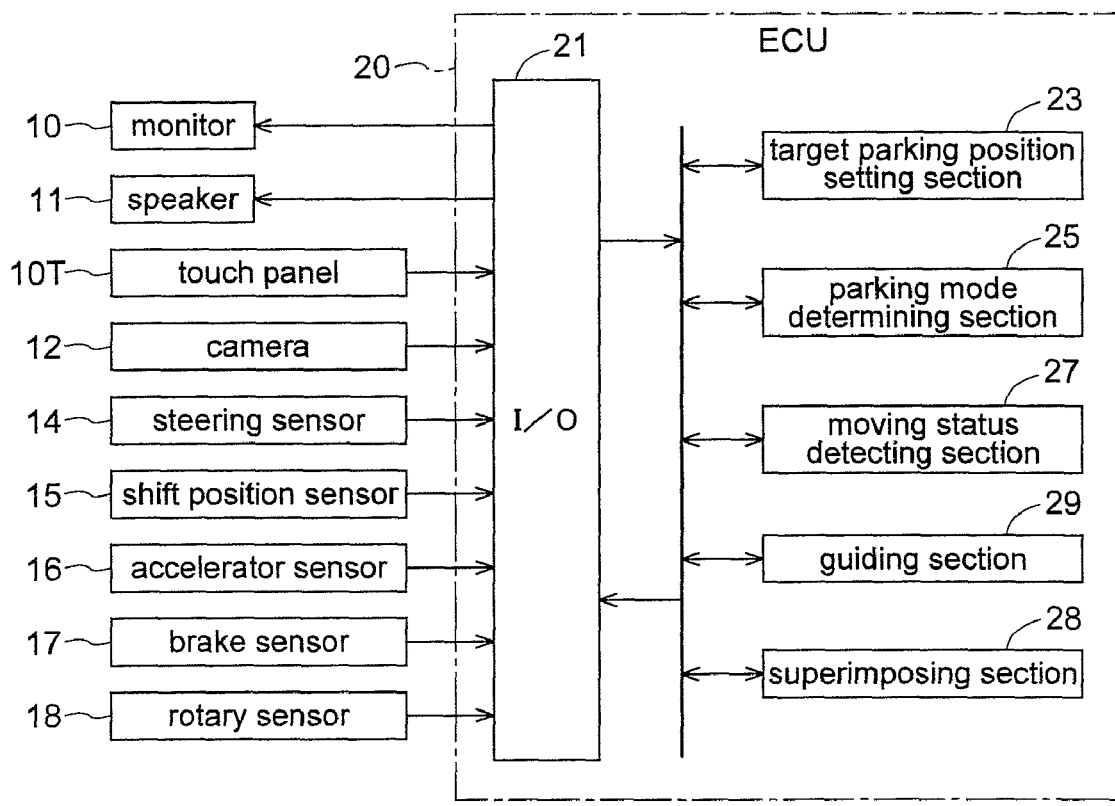
FIG. 16 is a block diagram schematically illustrating an arrangement of the components of the parking assist apparatus in accordance with the third embodiment of the present invention.
Figure 17:
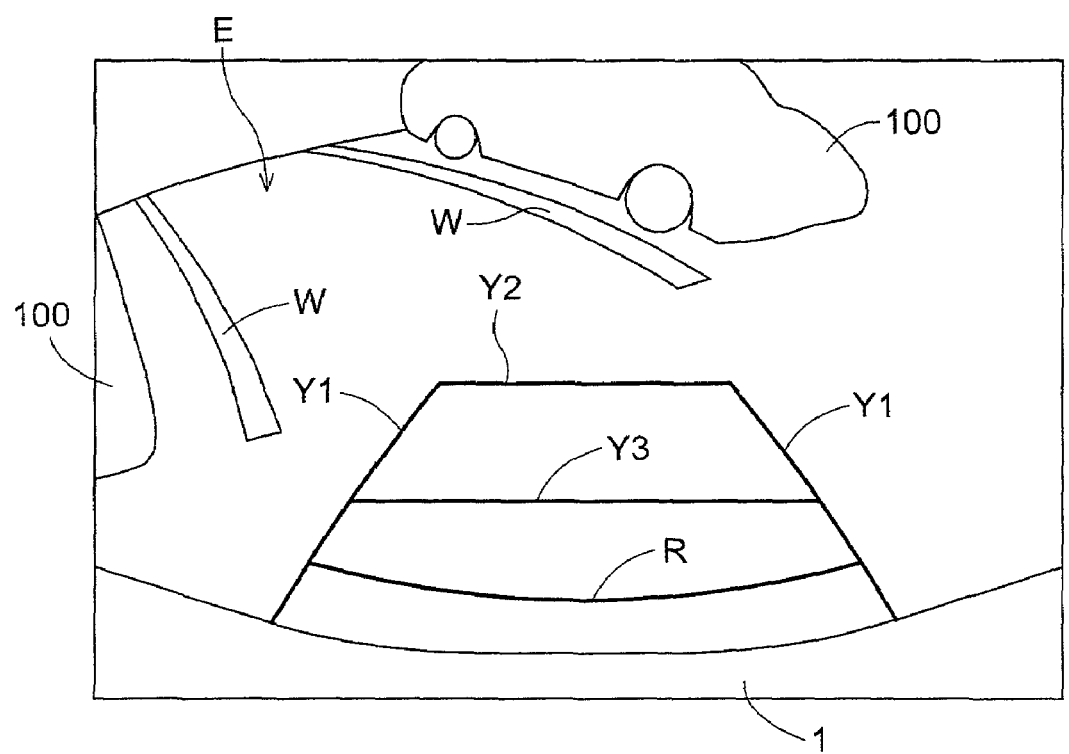
FIG. 17 illustrates one example of a display of a monitor.

In the above first and second embodiments, the present invention has been described as being applied to the parking assist apparatus for assisting the parking based on the automatic steering control. It would be understood that the present invention is also applicable to the parking assist apparatus for giving the assistance based on manual steering control. FIGS. 15 to 17 show one example in which the present invention is applied to the parking assist apparatus for giving the assistance based on the manual steering control.

FIG. 15 is a perspective view of the vehicle relating to a third embodiment. The vehicle 1 is provided with cameras 12 at a front end and a rear end thereof. Each of the cameras 12 is a digital camera including a built-in image-capturing element such as a CCD (charge coupled device) or a CIS (CMOS image sensor) for outputting a shot image as video information. Each camera 12 is mounted with a slight depression angle forwardly or rearwardly of the vehicle 1. Both the cameras 12 have a function to output the video image on a real-time basis.

FIG. 16 is a block diagram schematically showing the arrangement of the parking assist apparatus relating to the present embodiment. As shown in the drawings, an input system is formed including the camera 12. On the other hand, an output system is formed including the monitor 10 for displaying the image shot by the camera 12. Further, the ECU 20 includes a superimposing section 28 which allows guide information to be superimposed on the shot image and displayed in the monitor 10.

FIG. 17 shows an example of a display screen in which the guide information is superimposed on the shot image. In this example, guide lines Y1, Y2, Y3 and R are superimposed on the image shot by the camera 12 directed rearward. The shot image has a rear bumper of the vehicle 1 at a lower part thereof. It is intended in this example to park the vehicle 1 in the target parking area E defined by a parking frame line W. For instance, the guide lines Y1 represent vehicle-width extension lines, the guide line Y2 represents a standard line for 5 meters behind the vehicle, the guide line Y3 represents a standard line for 3 meters behind the vehicle, and the guide line R represents a precautionary line for 1 meter behind the vehicle.

Even in the parking assist apparatus for assisting the parking using the visible guide in this way, it is required in most cases to determine the parking mode and set the target parking position when the parking assistance is started. Conventionally, the parking mode is inputted using the instruction input means such as the touch panel 10T. If the present invention is employed, the parking mode can be satisfactorily determined using the steering wheel 4 operated by the driver while driving.

The present invention has been described as above referring to a number of embodiments. It is easy for any person of ordinary skill in the art to modify part of any of the above-noted embodiments to practice the present invention. It would be apparent that such modification also falls within the technical scope of the present invention.

INDUSTRIAL UTILITY

The present invention is applicable to a parking assist apparatus for assisting driving operations when parking a vehicle.

The invention claimed is:

1. A parking assist apparatus for assisting parking of a vehicle, the apparatus comprising:
 a candidate target parking position setting section for temporarily setting a candidate target parking position for the vehicle for each of a plurality of parking modes in a predetermined stop position;
 a target parking position determining section for determining a parking mode from the plurality of parking modes and a target parking position corresponding to the determined parking mode, based on an operation of a steering wheel by a driver after the candidate target parking positions are set; and
 a guiding section for guiding the vehicle to the target parking position.

2. The parking assist apparatus as claimed in claim 1, wherein the target parking position determining section determines that a parking mode is parallel parking when the steering wheel is not operated by a predetermined amount or more, while determines that the parking mode is garage parking when the steering wheel is operated by the predetermined amount or more in the vicinity of the predetermined stop position.

3. The parking assist apparatus as claimed in claim 1, wherein the target parking position determining section determines that a parking mode is right side garage parking when the steering wheel is operated counterclockwise by a predetermined amount or more, while determines that the parking mode is left side garage parking when the steering wheel is operated clockwise by the predetermined amount or more in the vicinity of the predetermined stop position.

4. The parking assist apparatus as claimed in claim 1, wherein the guiding section is adapted to guide the vehicle to a reverse movement starting position located forwardly of the predetermined stop position and then guide the vehicle to the target parking position located rearwardly of the reverse movement starting position, and
 wherein the target parking position determining section determines that a parking mode is right side parallel parking when the steering wheel is operated clockwise by the predetermined amount or more in the vicinity of the reverse movement starting position, while determines that the parking mode is left side parallel parking when the steering wheel is operated counterclockwise by the predetermined amount or more.

5. The parking assist apparatus as claimed in claim 1, wherein the target parking position determining section determines a parking mode based on the operation of the steering wheel when the vehicle is at a stop.

6. The parking assist apparatus as claimed in claim 1, wherein the guiding section is adapted to guide the vehicle to the target parking position through a reverse movement starting position that is located forwardly of the predetermined stop position based on automatic steering control, and
 wherein the steering wheel acts as instruction input means for instructing the target parking position determining section on a parking mode after the parking assistance is started and before the automatic steering control is started, and acts as halt input means for instructing the guiding section of a halt of the automatic steering control after the automatic steering control is started and before the automatic steering control is completed.

7. The parking assist apparatus as claimed in claim 1 being adapted to assist the parking of the vehicle corresponding to a plurality of parking modes, wherein the candidate target parking position determining section is adapted to determine a candidate target parking position for each of the target parking modes in the predetermined stop position thereby determining the plurality of candidate target parking positions corresponding to the plurality of parking modes, and wherein the target parking position determining section is adapted to determine a parking mode and the target parking position corresponding to the parking mode from the plurality of parking modes and the plurality of candidate target parking positions based on an operation of the steering wheel performed by a driver.

8. The parking assist apparatus as claimed in claim 7, wherein the plurality of parking modes include at least two modes of a right side garage parking, a left side garage parking, a right side parallel parking, and a left side parallel parking.

* * * * *